US012374771B2

(12) United States Patent
Chen et al.

(10) Patent No.: US 12,374,771 B2
(45) Date of Patent: Jul. 29, 2025

(54) CLAMP ASSEMBLY FOR BASE STATION ANTENNA

(71) Applicant: Outdoor Wireless Networks LLC, Claremont, NC (US)

(72) Inventors: Chen Chen, Jiangsu (CN); Shanguang Zhang, Jiangsu (CN); Bingyang Li, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 124 days.

(21) Appl. No.: 18/180,333

(22) Filed: Mar. 8, 2023

(65) Prior Publication Data

US 2023/0327318 A1 Oct. 12, 2023

(30) Foreign Application Priority Data

Apr. 7, 2022 (CN) ........................ 202210360937.4

(51) Int. Cl.
*H01Q 1/12* (2006.01)

(52) U.S. Cl.
CPC ................................ *H01Q 1/1228* (2013.01)

(58) Field of Classification Search
CPC ............................ H01Q 1/1228; H01Q 1/246
See application file for complete search history.

(56) References Cited

U.S. PATENT DOCUMENTS 4,595,165 A * 6/1986 Klingensmith ...... H01Q 1/1221 248/539
2020/0119537 A1* 4/2020 Heath ................. H01Q 1/1242
2021/0066779 A1* 3/2021 Udagave ................. H01Q 3/06
2021/0194109 A1* 6/2021 Shao .................... H01Q 1/1242
2021/0408661 A1* 12/2021 Yoo ....................... H01Q 1/246
2022/0018124 A1* 1/2022 Ayars ..................... E04F 10/10
(Continued)

FOREIGN PATENT DOCUMENTS

CA 3058054 A1 * 4/2020 .............. E04G 1/14
CN 205944384 U * 2/2017
(Continued)

OTHER PUBLICATIONS

Smak et al "The influence of Hot-Dip Galvanizing on the Mechanical Properties of High-Strength Steels" Materials 2021, 14, 5219, https://www.ncbi.nlm.nih.gov/pmc/articles/PMC8467660/ (Year: 2021).*

(Continued)

*Primary Examiner* — Terrell L McKinnon
*Assistant Examiner* — Ding Y Tan
(74) *Attorney, Agent, or Firm* — Myers Bigel, P.A.

(57) ABSTRACT

A clamp assembly includes a first clamping element and a second clamping element configured to be connected together with connecting elements and clamp a mounting pole therebetween. Each of the first clamping element and the second clamping element is configured to include a first part and a second part that are separate from each other, where the first and second parts are made of different materials and connected to each other with fastening elements; and in which, the first part is configured as a clamp body for directly or indirectly mounting or fixing a base station antenna; and the second part is configured as a clamping part for clamping the mounting pole.

16 Claims, 9 Drawing Sheets

(56) References Cited

U.S. PATENT DOCUMENTS

| | | | | |
|---|---|---|---|---|
| 2022/0393333 | A1* | 12/2022 | Liu | H01Q 3/06 |
| 2023/0012739 | A1* | 1/2023 | Udagave | H01Q 1/246 |
| 2023/0063114 | A1* | 3/2023 | Wang | H01Q 3/06 |
| 2023/0178874 | A1* | 6/2023 | Kim | F16C 11/045<br>343/702 |

FOREIGN PATENT DOCUMENTS

| | | | | | |
|---|---|---|---|---|---|
| CN | 113937457 | A | * | 1/2022 | |
| CN | 215626412 | U | * | 1/2022 | |
| KR | 20210154055 | A | * | 12/2021 | |
| WO | WO-2021074335 | A1 | * | 4/2021 | H01Q 1/12 |

OTHER PUBLICATIONS

Heavy duty pole to pole mount-EZ-HD-PTP-8 sold on amazon.com, first available date: Feb. 10, 2016, https://www.amazon.com/Easy-Up-Heavy-Duty-Mount/dp/B01BMVXL10 (Year: 2016).*

"A complete guide to stainless steel" online blog article posted by David Hilscher in Metal Casting Resources of Reliance Foundry, published on Feb. 15, 2022 https://www.reliance-foundry.com/blog/stainless-steel?srsltid=AfmBOoovCKEY-o_UleyYM5ISGgbsVykiKRLSdk73k49pPnlypy8yZjtS (Year: 2022).*

UngSung Double Antenna Mast Clamp for TV CB Ham Antenna Pipe-Mounting sold on amazon.com, first available date: Sep. 16, 2021 https://www.amazon.com/UngSung-Antenna-Anti-Rust-Finished-Pipe-Mounting/dp/B09GFYJZ6J?th=1 (Year: 2021).*

* cited by examiner

CLAMP ASSEMBLY FOR BASE STATION ANTENNA

RELATED APPLICATION

The present application claims priority from and the benefit of Chinese Patent Application No. 202210360937.4, filed Apr. 7, 2022, the disclosure of which is hereby incorporated herein by reference in full.

FIELD OF THE INVENTION

The present disclosure relates to the field of wireless communication technology in general. More particularly, the present disclosure relates to a clamp assembly for fixing a base station antenna on a mounting pole.

BACKGROUND OF THE INVENTION

Current clamps for fixing base station antennas to mounting poles are typically made of steel provided with a galvanized coating. The galvanized coating is used to prevent clamp corrosion due to, for example, moisture, rainwater, etc.

However, this galvanized coating may cause certain drawbacks. Specifically, on one hand, the galvanized coating causes the surface of the clamp to be smoother, allowing the clamp and base station antenna fixed with the clamp to slide more easily on the mounting pole; on the other hand, the strength of steel is reduced during galvanization, causing the gripping strength of the finished clamp to be insufficient. Therefore, it may be difficult for current clamps to securely fix base station antennas on mounting poles. This drawback is more pronounced when fixing 5G base station antennas, because typically 5G base station antennas are heavier and the lateral wind load of 5G base station antennas is also greater than that of 4G base station antennas, making it difficult to use the current clamps to fix 5G base station antennas. For example, because 5G base station antennas are heavier, when using a current clamp to fix a 5G base station antenna, the clamp slides down the mounting pole more easily; and because the 5G base station antenna bears high lateral wind load, the clamp may rotate around the mounting pole when the current clamp is used to fix the 5G base station antenna. Therefore, it is difficult for current clamps to securely fix 5G base station antennas on mounting poles. In addition, the galvanized coating is typically very fragile, such that the clamping portion of the clamp (for example, teeth provided on the clamp) wears away within a short period of time.

One common way to solve the above technical problems is to increase the thickness of steel used to make the clamp. However, the weight of the clamp increases significantly, which is undesirable.

SUMMARY OF THE INVENTION

One object of the present disclosure is to overcome at least one drawback in the prior art and realize other additional advantages.

In a first aspect of the present disclosure, a clamp assembly for a base station antenna is provided. The clamp assembly includes a first clamping element and a second clamping element configured to be connected together with connecting elements and clamp the mounting pole therebetween. Each of the first and second clamping elements is configured to include a first part and a second part that are separate from each other, where the first and second parts are made of different materials and connected to each other with fastening elements. The first part is configured as a clamp body for directly or indirectly mounting or fixing the base station antenna; and the second part is configured as a clamping part configured to clamp the mounting pole.

According to an embodiment of the present disclosure, the first part is made of a relatively lightweight material, and the second part is made of a relatively high-strength material.

According to an embodiment of the present disclosure, the first part is made of aluminum, and the second part is made of stainless steel or ceramic material.

According to an embodiment of the present disclosure, the first part includes a first leg, a second leg, and a bridge connecting the first leg and the second leg, and the second part includes a first leg, a second leg, and a bridge connecting the first leg and the second leg of the second part, in which the first leg and the second leg of the first part are detachably fastened together with the first leg and the second leg of the second part, respectively.

According to an embodiment of the present disclosure, the first part includes at least one groove for receiving the first leg and/or the second leg of the second part and positioning the second part.

According to an embodiment of the present disclosure, the bridge of the first part has a flat surface and is provided with one or a plurality of through holes for the connecting elements to extend through.

According to an embodiment of the present disclosure, the first part includes a reinforcement plate that extends parallel to the bridge of the first part and is spaced apart from the bridge of the first part by a certain distance.

According to an embodiment of the present disclosure, the second part has clamping features, which are provided in the middle of the second part and have an arcuate opening.

According to an embodiment of the present disclosure, the arcuate opening opens towards the bridge of the second part, thereby forming two parts spaced apart from each other from the bridge of the second part.

According to an embodiment of the present disclosure, the edges of the arcuate opening are provided on the first leg and the second leg of the second part, and include a plurality of serrations.

According to an embodiment of the present disclosure, the connecting element is a bolt.

According to an embodiment of the present disclosure, the fastening elements are one or more of pegs, screws and bolts.

According to an embodiment of the present disclosure, the first part and the second part are made by one or more of extrusion molding, injection molding, casting, and machining.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

BRIEF DESCRIPTION OF THE DRAWINGS

A plurality of aspects of the present disclosure will be better understood after reading the following specific embodiments with reference to the attached drawings. Among the attached drawings.

It should be understood that in all the attached drawings, the same symbols denote the same elements. In the attached drawings, for clarity, the size of certain feature is not drawn to scale as it may change.

DETAILED DESCRIPTION OF SPECIFIC EMBODIMENTS

Figure 1:
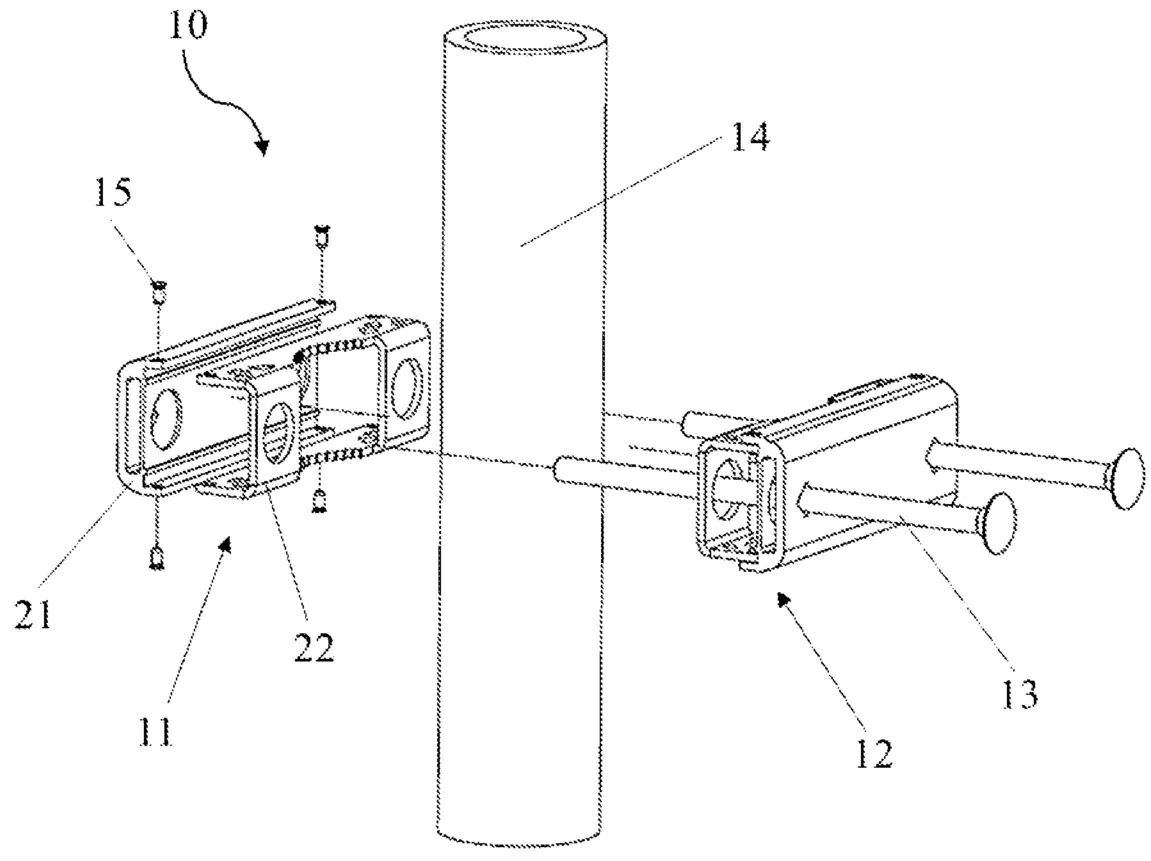
FIG. 1 is an exploded perspective view of a clamp assembly according to an embodiment of the present disclosure.

The present disclosure will be described below with reference to the attached drawings, and the attached drawings illustrate certain embodiments of the present disclosure. However, it should be understood that the present disclosure may be presented in many different ways and is not limited to the embodiments described below; in fact, the embodiments described below are intended to make the content of the present disclosure more complete and to fully explain the protection scope of the present disclosure to those skilled in the art. It should also be understood that the examples disclosed in the present disclosure may be combined in various ways so as to provide more additional examples.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms “a”, “an”, “the” and “this” used in the Specification all include plural forms unless clearly indicated. The words “include”, “contain” and “have” used in the Specification indicate the presence of the claimed features, but do not exclude the presence of one or a plurality of other features. The word “and/or” used in the Specification includes any or all combinations of one or a plurality of the related listed items.

In the Specification, when it is described that an element is “on” another element, “attached” to another element, “connected” to another element, “coupled” with another element, or “in contact with” another element, etc., the element may be directly on another element, attached to another element, connected to another element, coupled with another element, or in contact with another element, or an intermediate element may be present.

In the Specification, the terms “first”, “second”, “third”, etc. are only used for convenience of description and are not intended for limitation. Any technical features represented by “first”, “second”, “third”, etc. are interchangeable.

In the Specification, terms expressing spatial relations such as “upper”, “lower”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being “below” other features now can be described as being “above” the other features”. The device may also be oriented by other means (rotated by 90 degrees or at other locations), and at this time, a relative spatial relation will be explained accordingly.

The present disclosure intends to provide a clamp assembly suitable for securely fixing a base station antenna (in particular, a heavier 5G base station antenna with a larger lateral wind load) to a mounting pole.

Figure 2:
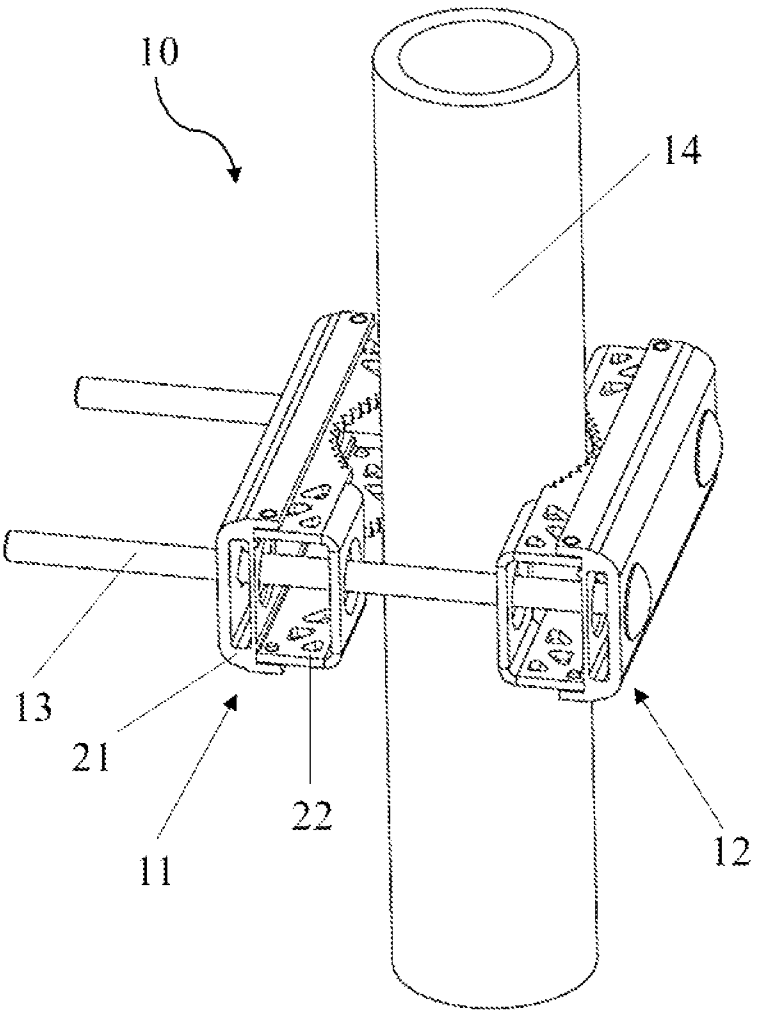
FIG. 2 is an assembled perspective view of the clamp assembly shown in FIG. 1.
Figure 3:
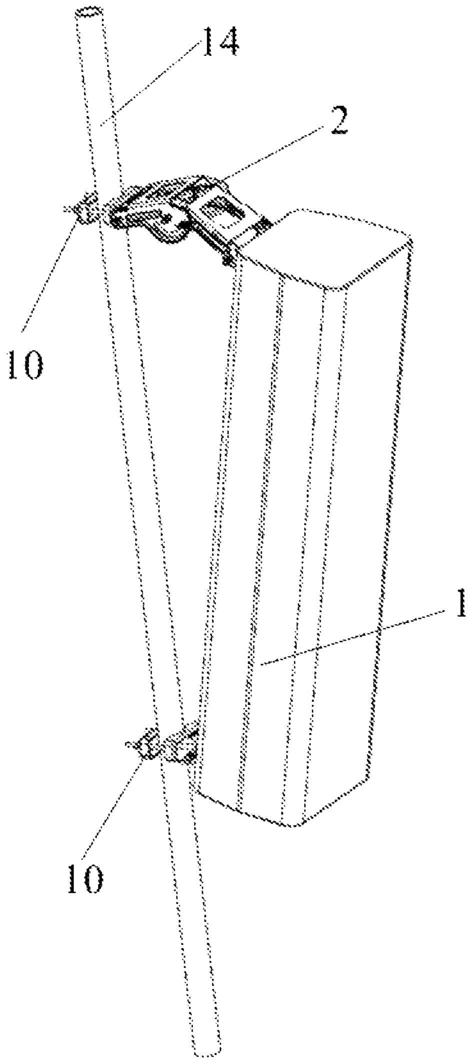
FIG. 3 is a perspective view of the clamp assembly shown in FIG. 1 fixing a base station antenna on a mounting pole.

A clamp assembly 10 according to an embodiment of the present disclosure is shown with reference to FIG. 1 and FIG. 2. The clamp assembly 10 may include a first clamping element 11 and a second clamping element 12. The first clamping element 11 and the second clamping element 12 may be connected together with connecting elements 13 (for example, bolts or threaded rods) and clamp a mounting pole 14 therebetween. The connecting elements 13 may connect the first clamping element 11 and the second clamping element 12 with varying tightness, so as to generate the desired clamping force on the mounting pole 14 to carry base station antennas with different weights and different lateral wind loads. As shown in FIG. 3, the base station antenna 1 may be connected to either the first clamping element 11 or the second clamping element 12 directly or via an antenna mounting assembly 2, thereby being fixed on the mounting pole 14 via the clamp assembly 10. The antenna mounting assembly 2 may be any type of antenna mounting assembly. For example, the antenna mounting assembly 2 may be an antenna mounting assembly that is capable of pivotally mounting the base station antenna 1 on the mounting pole 14, such that the tilt angle of the base station antenna 1 relative to the ground may be adjusted to adjust the main signal coverage area of the base station antenna 1. The antenna mounting assembly 2 may include a connecting bracket. The connecting bracket may abut any one of the first clamping member 11 and the second clamping member 12, and the connecting elements 13 may extend through the connecting bracket, the first clamping member 11 and the second clamping member 12, so that the antenna mounting assembly 2 is fixedly connected to the clamp assembly 10.

As shown in FIG. 1 and FIG. 2, the first clamping element 11 and the second clamping element 12 may have the same structure. According to an embodiment of the present disclosure, each of the first clamping element 11 and the second clamping element 12 may be configured to include two parts that are separate from each other. For example, each of the first clamping element 11 and the second clamping element 12 may include a first part 21 and a second part 22 that are separate from each other. The first part 21 and the second part 22 may be made of different materials to achieve different functions, respectively.

According to an embodiment of the present disclosure, the first part 21 (FIGS. 4*a*-4*e*) may be a clamp body. The base station antenna 1 or the antenna mounting assembly 2 of the base station antenna 1 may be mounted or fixed on the first part 21, which acts as the clamp body, such that the base station antenna 1 is mounted or fixed on the clamp assembly 10 via the first part 21 and is thus fixed on the mounting pole 14. Since the first part 21 is only used to mount or fix the base station antenna 1 or the antenna mounting assembly 2 of the base station antenna 1, the first part 21 does not need to have high strength required to generate clamping force. Thus, the first part 21 may be made of a lower strength and lightweight material compared to the second part 22, on one hand, to reduce the weight of the clamp assembly 10 and on the other hand, to save costs. According to an embodiment of the present disclosure, the first part 21 may be made of aluminum.

According to an embodiment of the present disclosure, the second part 22 (FIGS. 5*a*-5*e*) may be a clamping part for clamping the mounting pole 14. Since the second part 22 is used to clamp the mounting pole 14, the second part 22 should be capable of producing a desired clamping force to carry a large weight and a large lateral wind load, for example, a 5G base station antenna, to prevent the 5G base station antenna from sliding down the mounting pole 14 or rotating around the mounting pole 14. To this end, the second part 22 may be made of a high strength material for increasing the strength of the clamping part of the clamp assembly 10 to produce a desired clamping force. According to an embodiment of the present disclosure, the second part 22 may be made of stainless steel. Stainless steel is strong enough to withstand high clamping forces, and also has good corrosion resistance properties. Thus, when the second part 22 is made of stainless steel, the second part 22 also does not need to be provided with a galvanized coating for corrosion resistance, which further simplifies the manufacturing process of the second part 22 of the clamp assembly 10, reduces the manufacturing time of the second part 22, and thus reduces labor costs. According to another embodiment of the present disclosure, the second part 22 may be made of a ceramic material (for example, a carbon fiber composite ceramic material, etc.). Ceramic materials have sufficient strength and good corrosion resistance properties, and also have lighter mass. Thus, when the second part 22 is made of a ceramic material, the clamp assembly 10 has higher strength, a lower weight, and a longer service lifespan.

The specific structure of the first part 21 according to an embodiment of the present disclosure is shown with reference to FIGS. 4*a*-4*e*. The first part 21 may be configured as a substantial "U" shape. The first part 21 may include a first leg 211, a second leg 212, and a bridge 213 extending between and connecting the first leg 211 and the second leg 212. The bridge 213 may have a substantially flat surface 214. The bridge 213 may be provided with one or a plurality of through holes 215 for the connecting elements 13 to extend through. The through holes 215 may have any shape. In the embodiment shown in FIGS. 4*a* to 4*e*, the through holes 215 have a rectangular shape. However, the present disclosure is not limited thereto, and the through holes 215 may also be in the shape of a circle, a pentagon, a hexagon, etc. The first leg 211 and the second leg 212 of the first part 21 may be respectively provided with one or a plurality of connection holes 216. Fastening elements 15 (refer to FIG. 1) may extend through the connection holes 216 to detachably fasten the first part 21 and the second part 22 together. According to an embodiment of the present disclosure, the fastening elements 15 may be any suitable fastening element such as a peg, screw, bolt, etc.

According to an embodiment of the present disclosure, the first part 21 may be provided with one or a plurality of grooves 217 for receiving at least a part of the second part 22 and positioning the second part 22. The groove 217 may be formed between the first leg 211 and/or the second leg 212 and a flange 218. In the embodiment shown in FIGS. 4*a*-4*e*, the first part 21 may be provided with two grooves 217 provided between the first leg 211 and the first flange 218 and between the second leg 212 and the second flange 218, respectively. By providing grooves 217, the second part 22 may be positioned more easily relative to the first part 21, thereby enabling faster assembly of the first part 21 and the second part 22. Additionally, although two grooves 217 are included in the embodiment shown in FIGS. 4*a*-4*e*, in other embodiments, only one groove 217 may be included for receiving at least a part of the second part 22 (for example, either a first leg 221 or a second leg 222 of the second part 22 described below) and positioning the second part 22.

Figure 4A:
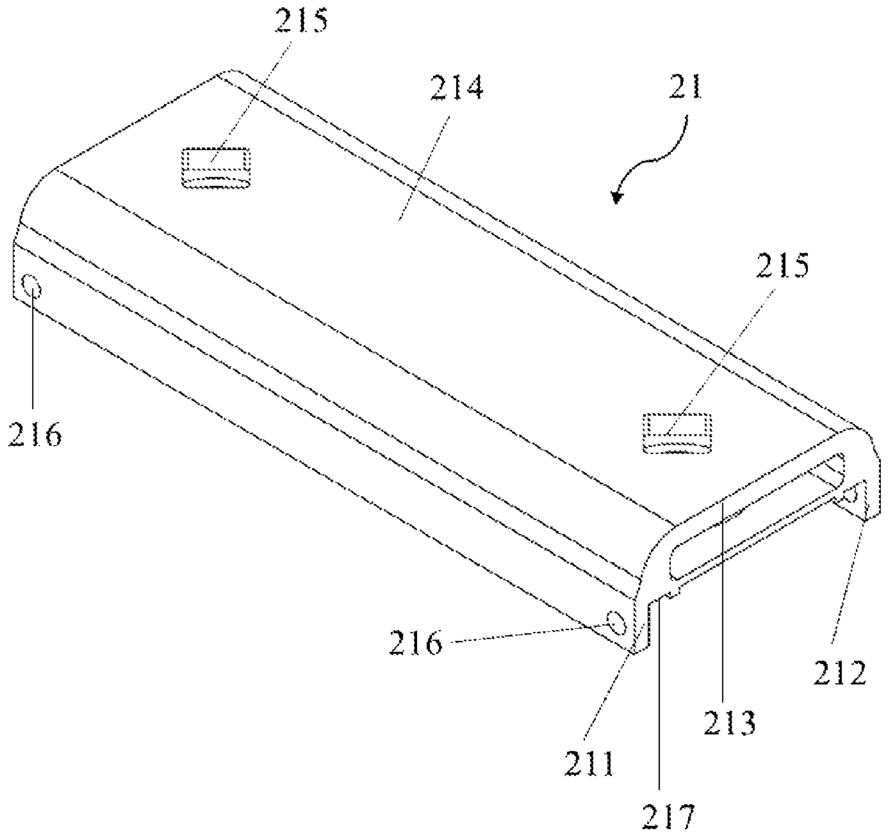
FIGS. 4*a* to 4*e* are respectively a top perspective view, bottom perspective view, top plan view, front plan view, and side plan view of a first part of a first and/or second clamping element of a clamp assembly according to an embodiment of the present disclosure.
Figure 4B:
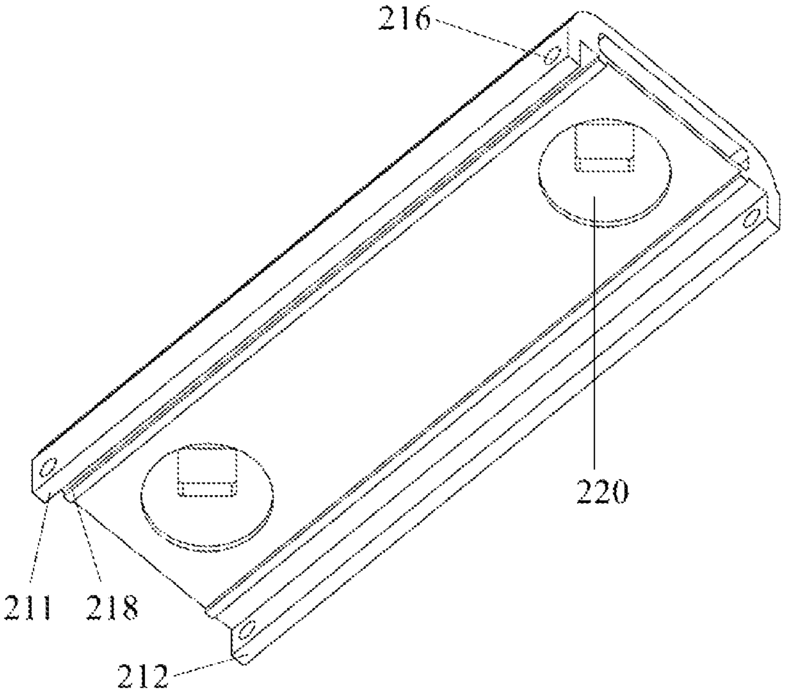
Figure 4C:
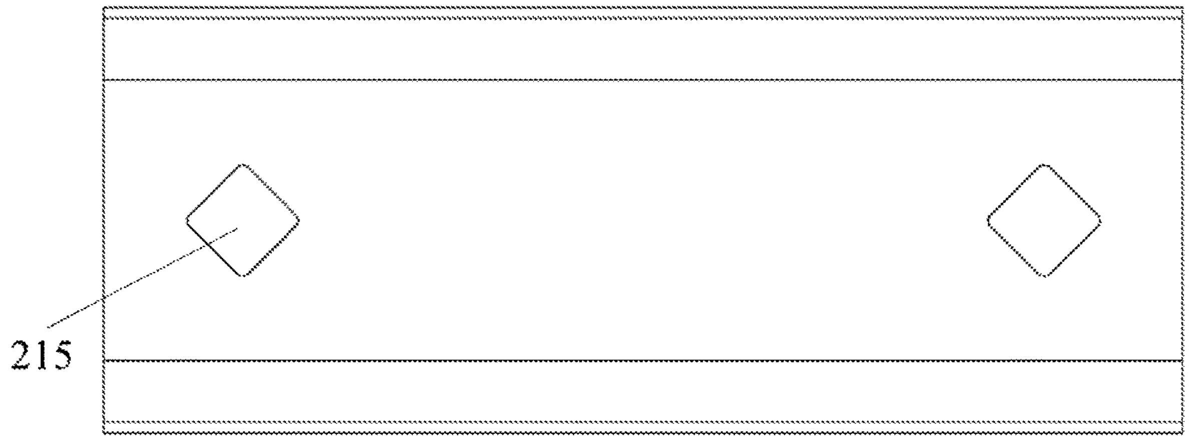
Figure 4D:
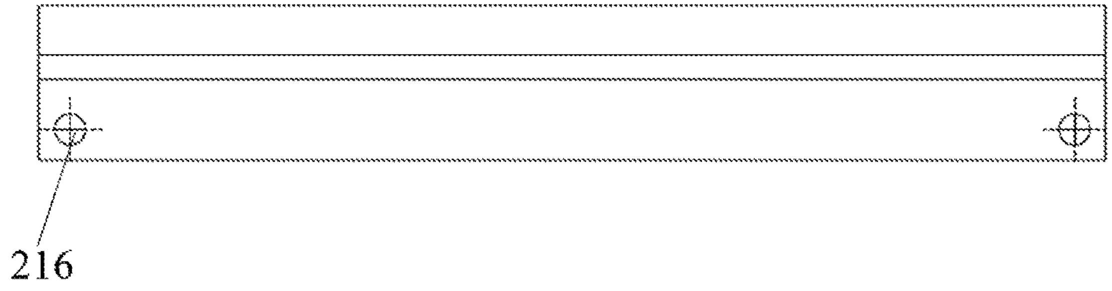
Figure 4E:
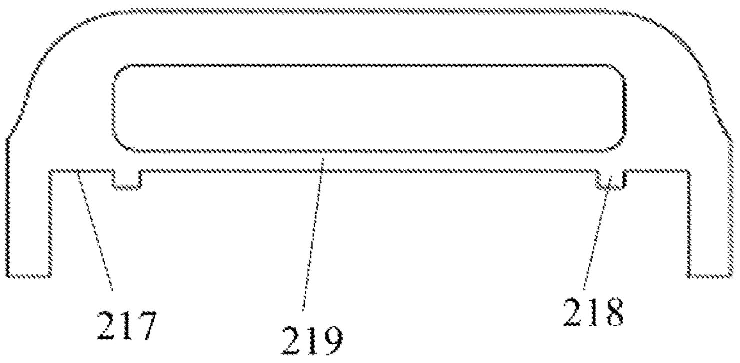
Figure 5A:
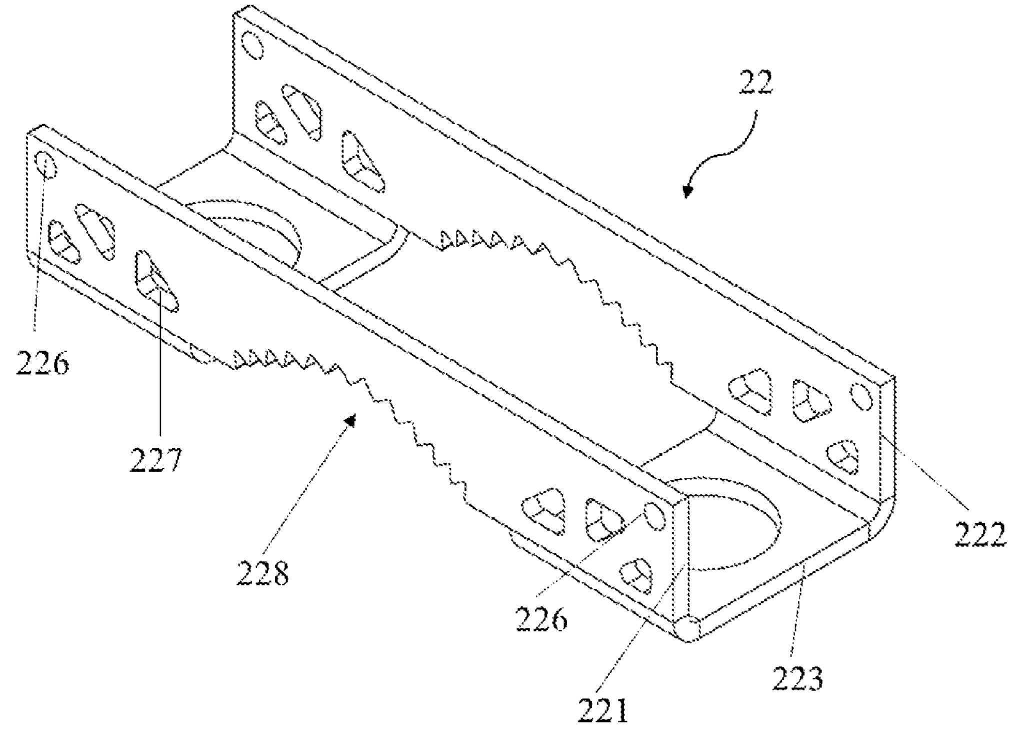
FIGS. 5*a* to 5*e* are respectively a top perspective view, bottom perspective view, top plan view, front plan view, and side plan view of a second part of a first and/or second clamping element of a clamp assembly according to an embodiment of the present disclosure.
Figure 5B:
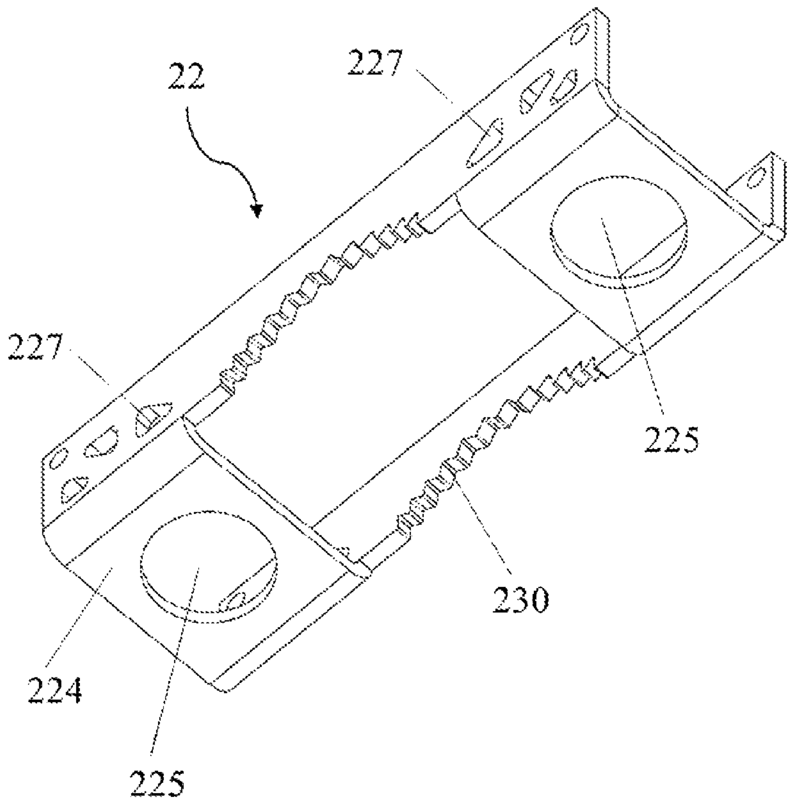
Figure 5C:
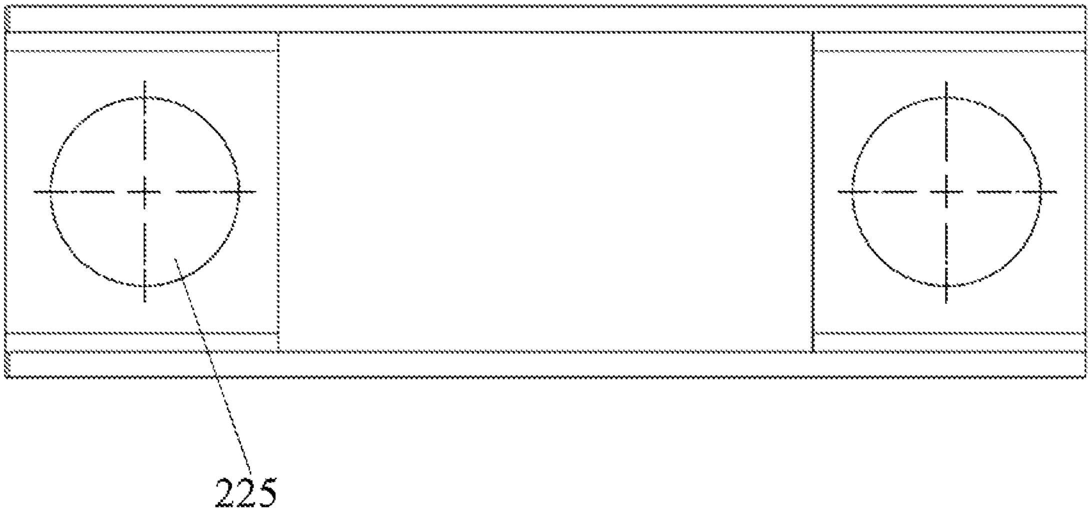
Figure 5D:
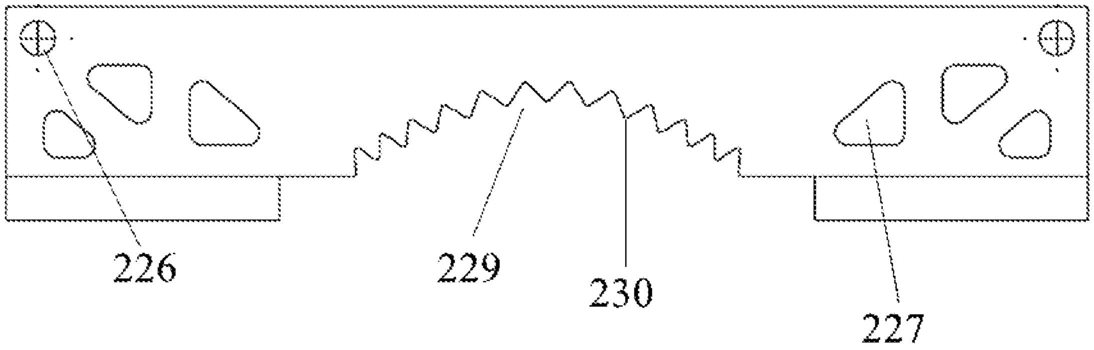
Figure 5E:
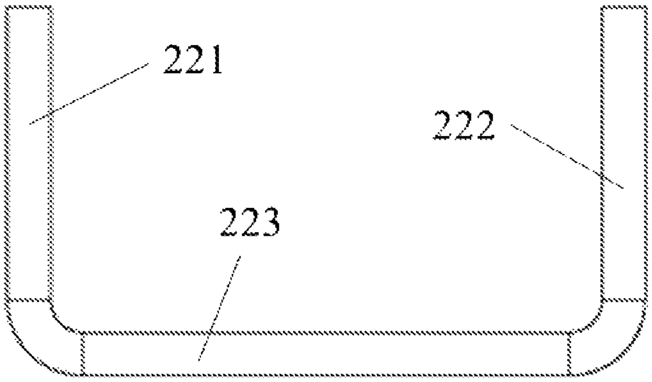
Figure 6A:
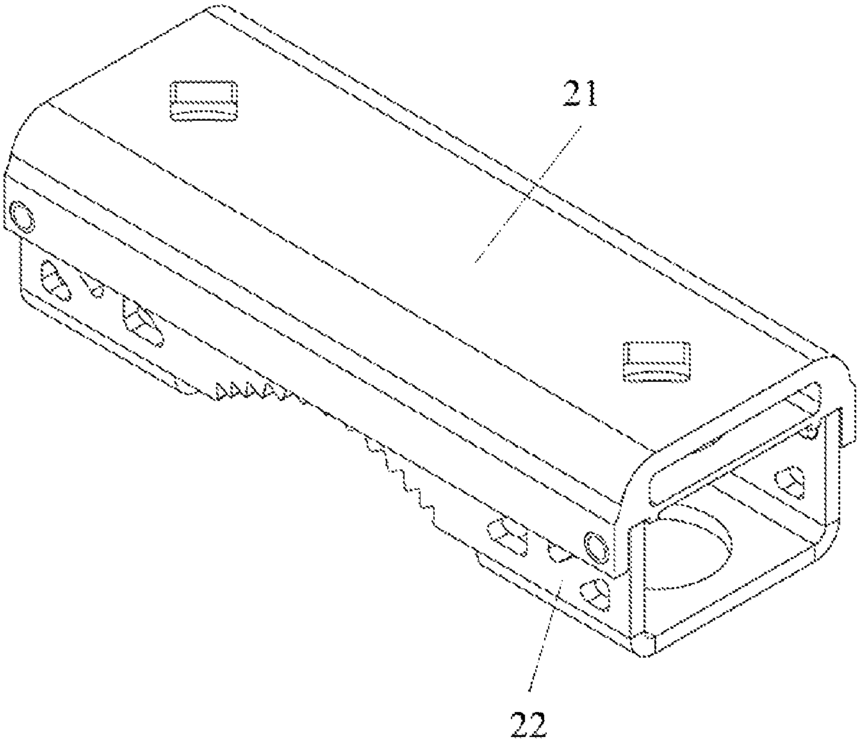
FIGS. 6*a* to 6*e* are respectively a top perspective view, bottom perspective view, top plan view, front plan view, and side plan view of a first and/or second clamping element formed from a first part and a second part.
Figure 6B:
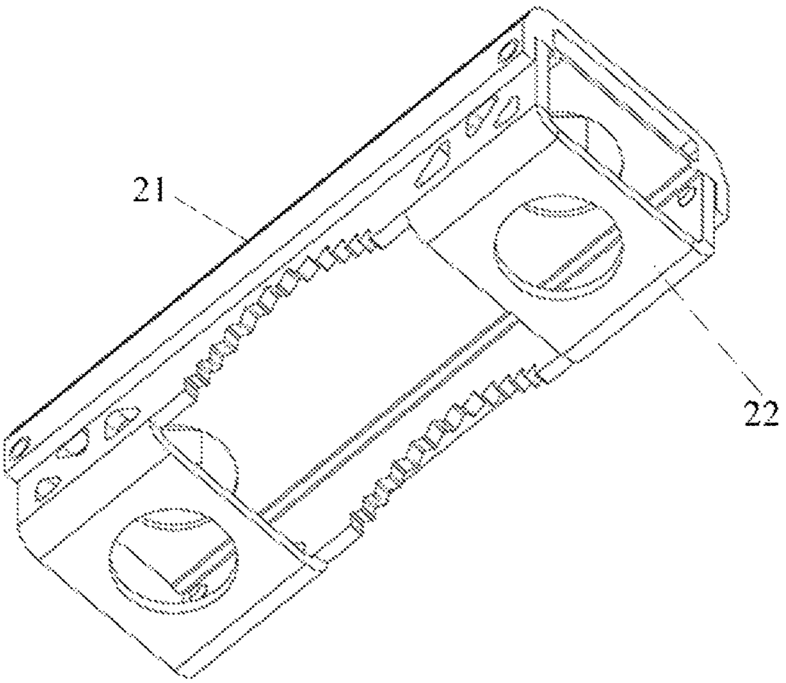
Figure 6C:
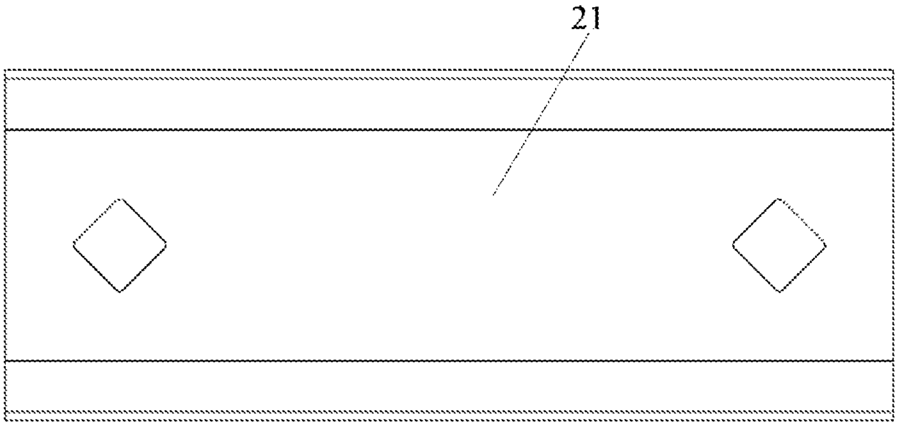
Figure 6D:
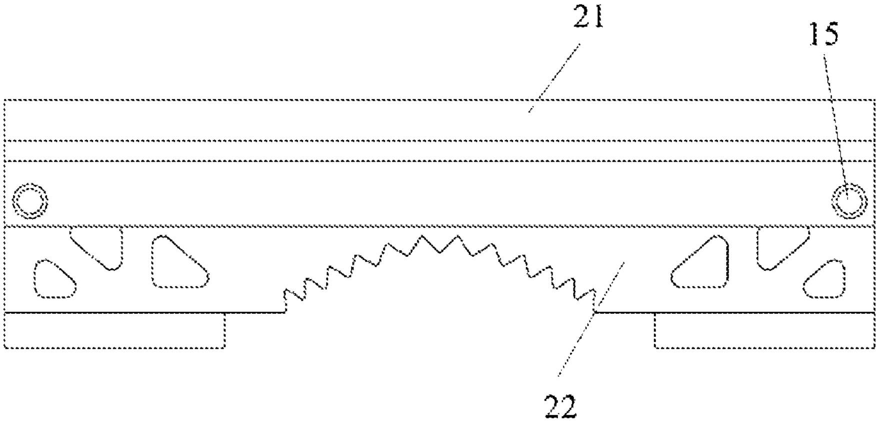
Figure 6E:
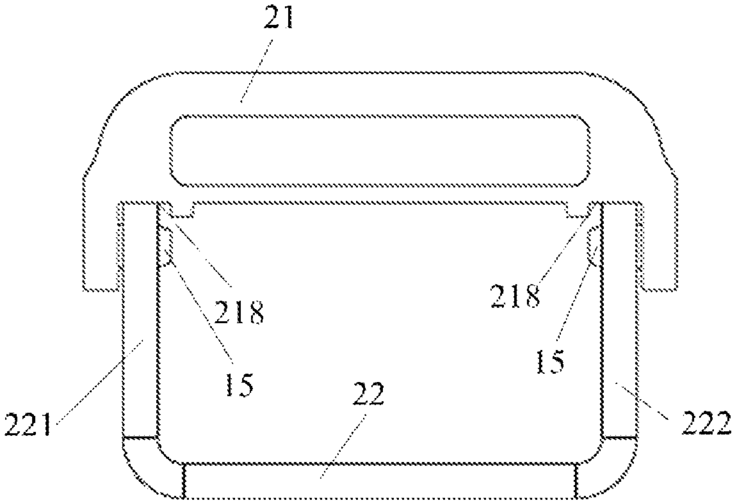

According to an embodiment of the present disclosure, as shown more clearly in FIGS. 4*a*, 4*b* and 4*e*, a connecting plate 219 is provided between the first flange and the second flange. The connecting plate 219 may act as a reinforcement plate for increasing the structural strength and deformation resistance (i.e., stiffness) of the first part 21. The connecting plate 219 may extend substantially parallel to the bridge 213 and be spaced apart from the bridge 213 by a certain distance. Such a structure increases the structural strength and deformation resistance of the first part 21, thereby enabling the first part 21 to be manufactured with a less strong and lighter material to further reduce the cost of the clamp assembly 10. In addition, in order not to obstruct the extension of the connecting elements 13 through the first part 21, the connecting plate 219 may be provided with one or a plurality of through holes 220. The position of each through hole 220 may correspond to the position of the through holes 215 to facilitate the extension of the connecting elements 13 through the through holes.

According to an embodiment of the present disclosure, the first part 21 may be made by extrusion. However, the present disclosure is not limited thereto. The first part 21 may also be made by injection molding, casting, machining, or the like.

The specific structure of the second part 22 according to an embodiment of the present disclosure is shown with reference to FIGS. 5*a* to 5*e*. The second part 22 may be configured in a substantially "U" shape. The second part 22 may include a first leg 221, a second leg 222, and a bridge 223 connecting the first leg 221 and the second leg 222. The bridge 223 may have a substantially flat surface 224. The bridge 223 may be provided with one or a plurality of through holes 225 for the connecting elements 13 to extend through. The through holes 225 may have any shape. In the embodiment shown in FIGS. 5*a* to 5*e*, the through holes 225 have a circular shape. However, the present disclosure is not limited thereto, and the through holes 225 may also be in the shape of a rectangle, pentagon, hexagon, etc. The first leg 221 and the second leg 222 of the second part 22 may be provided with one or a plurality of connection holes 226, respectively. The fastening elements 15 (refer to FIG. 1) may extend through the connection holes 226 to fasten the first part 21 and the second part 22 together. Additionally, a plurality of apertures 227 may also be provided on the first leg 221 and the second leg 222 of the second part 22 for further reducing the weight of the clamp assembly 10.

According to an embodiment of the present disclosure, the second part 22 may be provided with clamping features 228 (e.g., teeth or serrations 230). The clamping features 228 may be provided in the middle of the second part 22 and have an arcuate opening 229. The arcuate opening 229 may open towards the bridge 223, thereby dividing the bridge 223 into two parts spaced apart from one another, as shown more clearly in FIG. 5*b*. The mounting pole 14 may be received in the arcuate opening 229. In the structure shown in FIGS. 5*a*-5*e*, the edges of the arcuate opening 229 may be located on the first leg 221 and the second leg 222 of the second part 22. To enhance the clamping force of the second part 22, the edges of the arcuate opening 229 may be configured to include a plurality of serrations 230 (as shown more clearly in FIGS. 5*a*, 5*b*, and 5*d*), forming a serrated edge. When clamping the mounting pole 14, the serrations 230 abut the mounting pole 14 and are thus able to increase the clamping force on the mounting pole 14.

According to an embodiment of the present disclosure, the second part 22 may be machined using stainless steel. However, the present disclosure is not limited thereto. The second part 22 may also be made with a ceramic material by appropriate machining means.

The specific structure of the first clamping element 11 and/or second clamping element 12 formed by the first part 21 and second part 22 being connected to each other is shown with reference to FIGS. 6*a* to 6*e*. In the embodiment shown in FIGS. 6*a*-6*e*, when forming the first clamping element 11 and/or the second clamping element 12, the first leg 221 and the second leg 222 of the second part 22 are respectively positioned in the groove 218 and are adjacent the first leg 211 and the second leg 212 of the first part 21, respectively. The fastening elements 15 then extend through the connecting holes 216 of the first part 21 and the connecting holes 226 of the second part 22 and fasten the first part 21 and the second part 22 together, forming the first clamping element 11 and/or the second clamping element 12. Using the fastening elements 15 to fasten the first part 21 and the second part 22 makes assembly and disassembly of the first part 21 and the second part 22 very convenient.

According to an embodiment of the present disclosure, by configuring the first clamping element 11 and the second clamping element 12 to include a first part and a second part and to make the first part and the second part with different materials, the clamp assembly 10 according to the present disclosure has higher strength and/or lower weight, is particularly suitable for mounting or fixing 5G base station antennas, and also has lower material cost and manufacturing cost.

In addition, by configuring the first clamping element 11 and the second clamping element 12 to include a first part and a second part, the clamp assembly 10 according to the present disclosure may also have greater flexibility in use. For example, during the manufacturing process, the first part 21 may have a fixed size and configuration, while the second part 22 may have clamping features 228 of different sizes (for example, arcuate openings 229 of different sizes), so that the clamp assembly 10 according to the present disclosure is capable of clamping mounting poles of different diameters. Additionally, when the clamping features 228 of the second part 22 of the clamp assembly 10 are worn away, only the second part 22 may be replaced without discarding the entire clamp assembly 10, which greatly saves the cost of using the clamp assembly 10.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A clamp assembly for a base station antenna, comprising:

a first clamping element and a second clamping element configured to be connected together with connecting elements and clamp a mounting pole therebetween, wherein each of the first and second clamping elements is configured to include a first part and a second part that are separate from each other, the second part comprising a first leg, a second leg, and a bridge connecting the first leg and the second leg, wherein the first and second parts are made of different materials and the first and second legs of the second part are connected to the first part with fastening elements, and wherein the first part is configured as a clamp body for mounting or fixing the base station antenna; and the second part is configured as a clamping part configured to clamp the mounting pole.

2. The clamp assembly according to claim 1, wherein the first part is made of a relatively lightweight material, and the second part is made of a relatively high-strength material.

3. The clamp assembly according to claim 2, wherein the first part is made of aluminum, and the second part is made of stainless steel or ceramic material.

4. The clamp assembly according to claim 1, wherein the first part includes a first leg, a second leg, and a bridge connecting the first leg and the second leg of the first part, in which the first leg and the second leg of the first part are detachably fastened together with the first leg and the second leg of the second part, respectively.

5. The clamp assembly according to claim 1, wherein the first part includes at least one groove for receiving the first leg and/or the second leg of the second part and positioning the second part.

6. The clamp assembly according to claim 4, wherein the bridge of the first part has a flat surface and is provided with one or a plurality of through holes for the connecting elements to extend through.

7. The clamp assembly according to claim 6, wherein the first part includes a reinforcement plate which extends parallel to the bridge of the first part and is spaced apart from the bridge of the first part by a certain distance.

8. The clamp assembly according to claim 1, wherein the second part has clamping features, which are provided in the middle of the second part and have an arcuate opening.

9. The clamp assembly according to claim 8, wherein the arcuate opening opens towards the bridge of the second part, thereby forming two parts spaced apart from each other from the bridge of the second part.

10. The clamp assembly according to claim 9, wherein the edges of the arcuate opening are provided on the first leg and the second leg of the second part, and include a plurality of serrations.

11. The clamp assembly according to claim 1, wherein the connecting elements are bolts.

12. The clamp assembly according to claim 1, wherein the fastening elements are one or more of pegs, screws and bolts.

13. The clamp assembly according to claim 1, wherein the first part and the second part are made by one or more of extrusion molding, injection molding, casting, and machining.

14. A base station antenna assembly, comprising:

a base station antenna;

a mounting pole; and a clamp assembly defined in claim 1, wherein the second part of each of the first and second clamping assemblies is mounted to the mounting pole, and wherein the first part of the first clamping assembly is mounted to a bracket that is also mounted to the base station antenna.

15. A clamp assembly for a base station antenna, comprising:

a first clamping element and a second clamping element configured to be connected together with connecting elements and clamp a mounting pole therebetween, wherein at least one of the first and second clamping elements is configured to include a first part and a second part, the second part comprising a first leg, a second leg, and a bridge connecting the first leg and the second leg, and the first part comprising at least one groove configured to receive the first leg and/or the second leg of the second part and engage the first part and the second part to each other, wherein the first and second parts are made of different materials; and wherein the first part is configured as a clamp body for mounting or fixing the base station antenna; and the second part is configured as a clamping part configured to clamp the mounting pole.

16. A clamp assembly for a base station antenna, comprising:

a first clamping element and a second clamping element configured to be connected together with connecting elements and clamp a mounting pole therebetween, wherein each of the first and second clamping elements is configured to include a first part and a second part that are separate from each other, wherein the first and second parts are made of different materials and connected to each other with fastening elements;

wherein the first part is configured as a clamp body for mounting or fixing the base station antenna; and the second part is configured as a clamping part configured to clamp the mounting pole;

wherein the second part further comprises a first leg, a second leg, a bridge connecting the first and second legs, and clamping features; and wherein the clamping features have an arcuate opening which opens towards the bridge of the second part.

* * * * *